United States Patent [19]

Knapp

[11] 3,943,961
[45] Mar. 16, 1976

[54] COCK UNIT FOR HYDRAULIC SYSTEMS, WITH INTERCHANGEABLE DELIVERY SPOUTS

[76] Inventor: Alfons Knapp, Bleicherstrasse 3, Biberach an der Riss, Germany

[22] Filed: Oct. 23, 1974

[21] Appl. No.: 517,227

[30] Foreign Application Priority Data
Dec. 4, 1973 Italy.................................. 70549/73

[52] U.S. Cl. ........ 137/269; 137/636.2; 137/625.17; 285/281
[51] Int. Cl.² ......................................... F16K 11/00
[58] Field of Search ........... 137/269, 315, 271, 329, 137/625.17, 625.4, 636.2; 285/12, 281, 190

[56] References Cited
UNITED STATES PATENTS

| | | | |
|---|---|---|---|
| 288,457 | 11/1883 | Larkin | 137/269 X |
| 1,054,023 | 2/1913 | Niedecken | 137/269 |
| 2,044,052 | 1/1936 | Broadley | 285/190 |
| 2,537,683 | 1/1951 | Maier | 285/281 |
| 2,870,790 | 1/1959 | Jordan | 137/625.17 X |
| 3,030,980 | 4/1962 | Swart | 137/625.17 |
| 3,035,612 | 5/1962 | Lyon | 137/625.17 |
| 3,490,492 | 1/1970 | Fairchild | 137/625.4 |

*Primary Examiner*—Martin P. Schwadron
*Assistant Examiner*—Robert J. Miller
*Attorney, Agent, or Firm*—Young & Thompson

[57] ABSTRACT

A cock unit and particularly a single-control mixer wherein the outlet is formed by a union which is standardized with respect to a set of different delivery spouts, so that a single type of unit can be manufactured and stored, and then at the moment of installation it is made suitable for different uses, as for washstands, wash-tubs, bath tubs, bidets and so on, by suitably selecting a delivery spout within the available set.

3 Claims, 3 Drawing Figures

COCK UNIT FOR HYDRAULIC SYSTEMS, WITH INTERCHANGEABLE DELIVERY SPOUTS

BACKGROUND OF THE INVENTION

The present invention relates to a cock unit for hydraulic systems, especially domestic, sanitary or similar hydralic systems, which unit can be provided with anyone spout of a set of interchangeable delivery spouts.

In the industrial manufacture of cocks, the operations of mass production, storage and distribution are hampered by the fact that for each hydraulic system there must be provided units of different general construction, for instance one cock with a short spout for wash-stand, one with a long spout for wash-tub, one with spout and offtake for bath tub shower, one with a spout provided with an aerator convertible into shower for bidet, and so on. Although some inner parts of the cocks have already been standardized for the various types of cock units, thus obtaining a partial advantage with respect to the production, the unit, as a whole, is still different for the various applications. This implies on one hand an increase of the cost of the manufacture of cock bodies in different forms, on the other hand an increase of the cost of assembly because the production lines for the different units must be different from each other at least in a considerable end portion, and especially a heavy increase of the costs of storage, distribution and constitution of stocks with the dealers. In fact, provision has to be made for suitable stocks of each cock type to meet all requirements, although it can be expected that the most part of such stocks will be utilized only after a long period of time, owing to the inequality and non uniform distribution in the course of the time of the demand for the various cock types. Under these circumstances there is an appreciable increase of the global industrial cost of the cocks, especially in the case of modern and complex types of cocks.

BRIEF SUMMARY OF THE INVENTION

The object of the present invention is to obviate the just mentioned drawbacks, and this object is attained in virtue of the new concept consisting in that the whole cock unit, for instance a single-control mixer, is constructed in such a way as to have at the outlet of the unit a standardized union means arranged to receive thereon any delivery spout selected from a set of spouts apt to meet the various application requirements, all these spouts being in turn provided with standardized connection means made to fit with the union means of the cock unit.

In this way, the whole process of the manufacture, complete assembly and packing of the cock unit results to be completely standardized, irrespective of the application the unit will be used for, and the storage, the distribution and the provision of stocks of such units, which sometimes are considerably costly and bulky, may be scheduled according to the global demand for all the types of cocks; therefore, the manufacture is effected on a larger mass production and the provision of stocks is based on smaller quantities, so that the economy of the industrial production results to be considerable improved. As to the various types of interchangeable spouts forming a set, they still have to be manufactured separately and stored, distributed and stocked according to the demand for the various types, but it is quite clear that the disadvantages connected therewith are limited to pieces of very low value and overall dimensions, thus reducing to a minimum the increase of the production costs arising from the unavoidable inequality of the demand.

BRIEF DESCRIPTION OF THE DRAWINGS

The concept of the invention will appear more clearly from the following description of an illustrative and non limitative embodiment, shown diagrammatically in the accompanying drawings, in which:

FIG. 2 is a partially sectional view on a reduced scale of the same unit shown in FIG. 1, but equipped with a delivery spout provided with a convertible flexible offtake, adapted to be used for a bath tub with shower, a wash-tub or the like;

DETAILED DESCRIPTION OF THE PREFERRED EMBODIMENT

Figure 1:
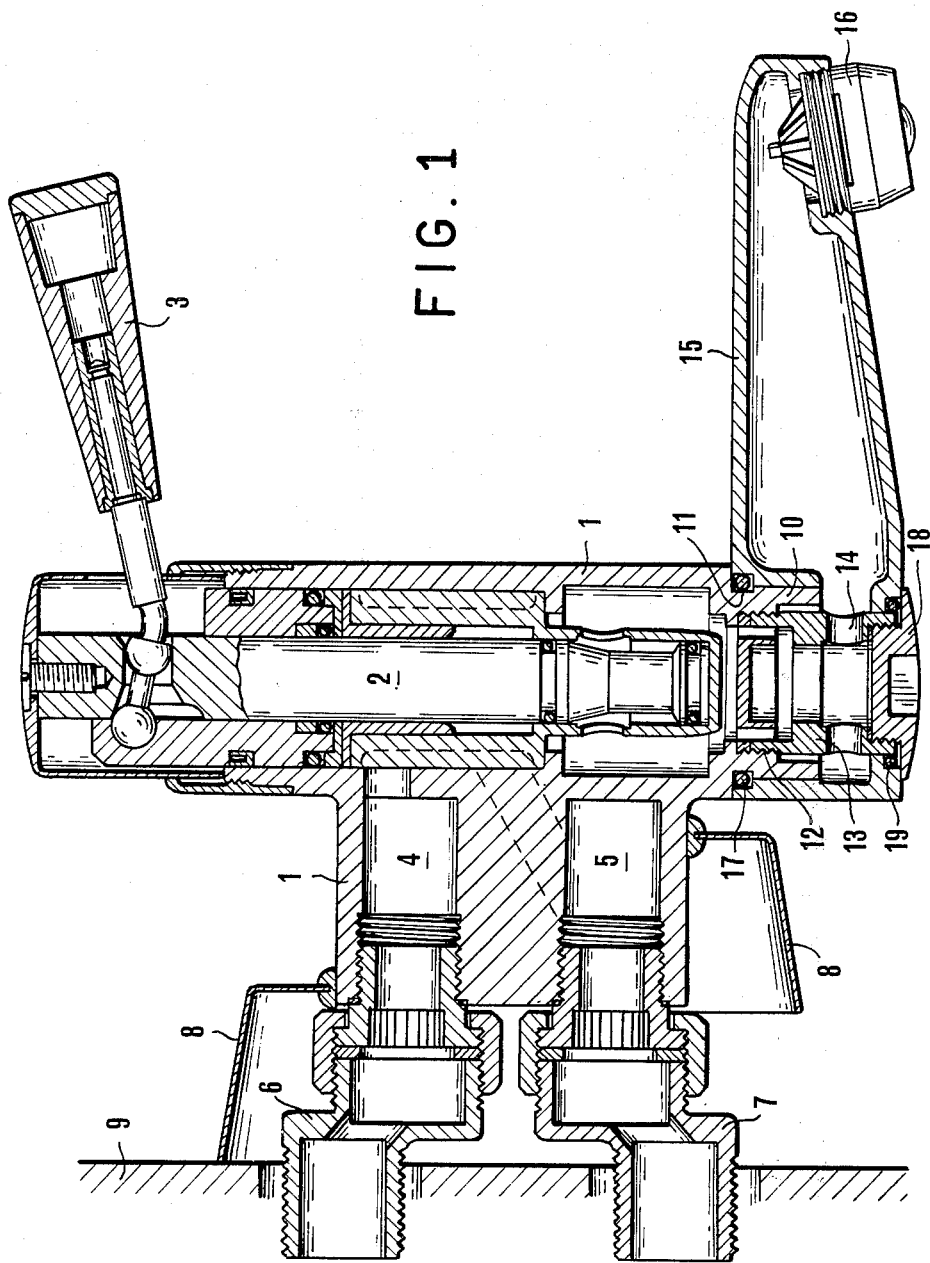
FIG. 1 is an axial sectional view of a single-control mixer unit for warm and cold water, equipped with a delivery spout with aerator for wash-stand, constructed according to the present invention.

The unit shown in the drawings comprises a body 1 having accomodated therein the mechanism 2 of a warm and cold water mixer controlled by means of one double-movement lever 3. The body 1 presents inlet unions 4 and 5 provided with gauge adaptors 6 and 7 arranged to be connected to water plugs immured in a wall 9 and to be then covered by a covering rose 8 shown, in the upper portion of FIG. 1, in its operative position and, in the lower portion of said FIG. 1, in a position spaced from the wall 9.

The operation of such a single-lever controlled mixing and valving mechanism is well known, as shown for example in British Pat. No. 1,106,290, and can be briefly summarized as follows:

By tilting the control lever 3 vertically, plug 2 of the valving mechanism is shifted vertically within the body 1, and the packing mounted in intermediate position on the plug 2 cooperates with a surrounding sealing seat for regulating the flow rate of the liquid passing through the cock unit, and for stopping all the flow in the lower position of lever 3 and plug 2.

On the other hand, by tilting the control lever 3 horizontally, the plug 2 is rotated about its own axis within the body 1, and recesses of the plug 2 cooperate with openings of the body 1, communicating respectively with the inlet unions 4 and 5 (these recesses and openings being not visible in the illustrated position of the valving mechanism), for increasing the free passage corresponding to the union 4 and simultaneously decreasing the free passage corresponding to the union 5, or vice-versa, thus varying the mixing ratio of the liquids (e.g. hot and cold water) admitted through said inlet unions, mixed within the body 1 and then delivered by the cock unit.

It is a particular feature of the invention that the unit 1–8, instead of being provided with a spout of a certain type terminates at its outlet end, which in the present case is the lower end thereof since the cock is disposed with its axis extending vertically, with a standardized union apt to receive any type of spout selected from a set of spouts coordinated with the unit in question. In the present case, the union of the cock unit is constituted by a sleeve 10 provided at its outer side with a seat 11 for a seal gasket and at its inner side with a thread 12. Screwed into the sleeve 10 is, in the present case, a threaded bushing 13 provided with radial bores 14, and said bushing may be considered as being a part of the union of the cock unit; however, in other cases, this bushing could be a part of the unions of the spouts.

The spout shown in FIG. 1 is constituted by a spout 15 with aerator 16 and may be suitable, for instance, for a wash-stand or a wash-tub. The spout 15 is provided, at its base, with a seat arranged to be inserted onto the sleeve 10 of the unit, establishing the seal with a gasket 17, and may be fixed by means of a threaded cap 18 sealed by means of a gasket 19, screwed into said bushing 13 of the union of the cock unit.

As it can be seen, the application of the spout on the cock unit is an extremely easy and quick operation and can be accomplished after the installation of the cock unit and, if necessary, after all the finishing operations in the room, thus obtaining the further advantage of protecting the spout against possible damages and soiling.

Figure 2:
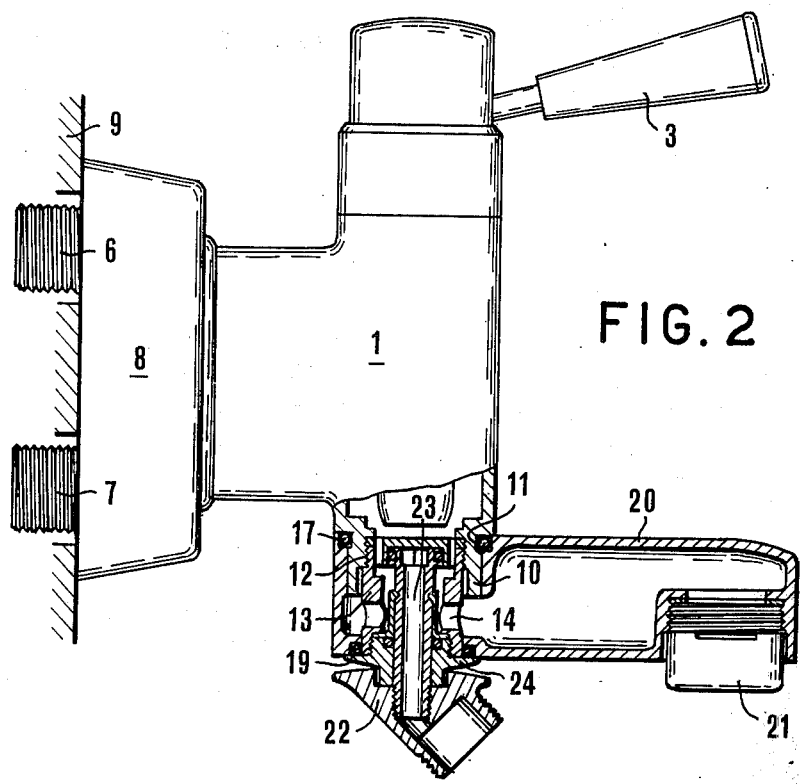

As shown in FIG. 2, the unit 1–8 provided with the union 10-14 is adapted to receive, instead of the spout with cap 15-19 for a wash-stand, a spout 20 with aerator 21 and offtake union 22 for a flexible pipe (for instance, of a shower) serving also as an actuating knob for an axially movable deviation device 23, passing through the cap 24 which serves to fasten the union 22 to the bushing 14, which cap, in this case, is provided with a bore. In view of the opportunity to install such a deviation device 23, the bushing 14 may be configurated in such a way as to cooperate with said device, completing it, as it has been done in the embodiment shown. Conversely, should the bushing 14 be a part of the union of the spout (a possibility which has already been mentioned), then it could be different for the spouts provided with a deviation device and for those which have no deviation device.

Figure 3:
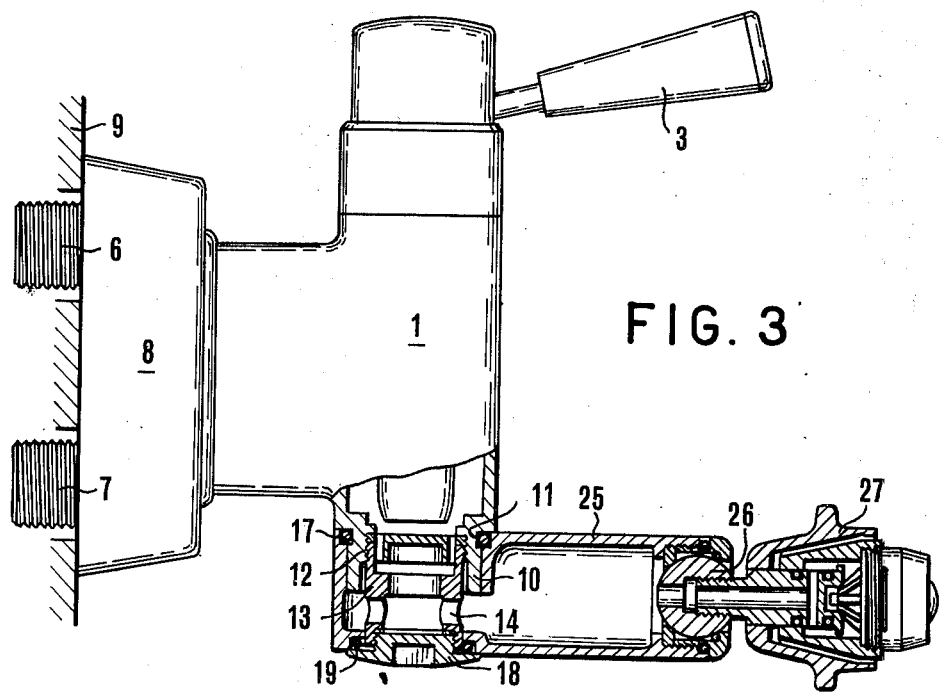
FIG. 3 is a view similar to that of FIG. 2, showing the same unit provided with a delivery spout for bidet.

As shown in FIG. 3, the unit 1–8 provided with a union 10–14 can also receive a spout 25 for a bidet, provided with an articulated union 26 having attached thereto a shower 27 convertible into aerator, known in itself, said spout being fixed to the bushing 14 and to the unit by means of a threaded cap 18 provided with a sealing gasket 19, as in the example shown in FIG. 1.

It is clear that numerous types of spouts may be provided in order to meet the various requirements and may be different from each other in their structure and dimensions. If desired, these spouts can also be interchanged after the unit has been put into service, thus avoiding to substitute the whole unit.

It is clear that the unit equipped according to FIG. 3 could also be mounted with its axis in horizontal position; this can be said also generally, provided the spouts are suitably configurated. In other words, the present invention is not limited to being applied to units oriented vertically, but is independent from the orientation, as well as from the specific type of the cock unit. It is to be noted in this respect that the set of interchangeable spouts which is intended for a certain unit, for example a single-control unit, may be standardized also with respect to other units, as for instance units provided with two controls, thermostatic units, and so on, thereby obtaining an additional advantage for the economy of the production.

Finally, it will be understood that the particular configuration of the standardized union may be different according to the type of the cock unit and the general use it is intended for. Also, the constructive particulars may vary widely with respect to what has been illustrated in the foregoing, without departing from the scope of the invention.

Having thus described my invention, what I claim is:

1. A cock unit comprising a body having an inlet and an outlet, the inlet comprising inlet unions for cold and warm water, the outlet comprising an outlet union, the body having a passage therethrough for the flow of water from the inlet unions to the outlet union, valve means in the passage for controlling the flow rate of both cold and warm water and for mixing together said cold and warm water and directing the resulting controlled flow to said outlet union, and a delivery spout comprising a spout body, an inlet union and a delivery mouth, the inlet union of the spout being complementary to and cooperable with and detachably connectible to said outlet union of the cock unit body, said outlet union of the cock unit body comprising an internally threaded sleeve, said inlet union of the spout comprising a cylindrical seat complementary to the external surface of said sleeve, a sealing gasket that seals between said spout and said sleeve, and a threaded fastener member screwed into said internally threaded sleeve and releasably connecting said delivery spout to said outlet union of the cock unit body.

2. A cock unit comprising a body having an inlet and an outlet, the inlet comprising inlet unions for cold and warm water, the outlet comprising an outlet union, the body having a passage therethrough for the flow of water from the inlet unions to the outlet union, valve means in the passage for controlling the flow rate of both cold and warm water and for mixing together said cold and warm water and directing the resulting controlled flow to said outlet union, a set of a number of different delivery spouts, each spout of the set comprising a spout body, an inlet union and a delivery mouth, the inlet unions of the different delivery spouts being all complementary to and cooperable with and detachably connectible to said outlet union of the cock unit body, whereby the thus standardized cock unit can be made suitable for different uses by selecting, at the time of installation, a suitable delivery spout from the available set of different delivery spouts, said outlet union of the cock unit body comprising an internally threaded sleeve, said inlet union of each spout comprising a cylindrical seat complementary to the external surface of said sleeve, and a sealing gasket that seals between said spout and said sleeve, and further comprising a threaded fastener member screwed into said internally threaded sleeve and releasably connecting a delivery spout of said set to said outlet union of th cock unit body.

3. A cock unit comprising a body having an inlet and an outlet, the inlet comprising inlet unions for cold and warm ater, the outlet comprising an outlet union, the body having a passage therethrough for the flow of water from the inlet unions to the outlet union, valve means in the passage for controlling the flow rate of both cold and warm water and for mixing together said cold and warm water and directing the resulting controlled flow to said outlet union, a set of a number of different delivery spouts, each spout of the set comprising a spout body, an inlet union and a delivery mouth, the inlet unions of the different delivery spouts being all complementary to and cooperable with and detachably connectible to said outlet union of the cock unit body, whereby the thus standardized cock unit can be made suitable for different uses by selecting, at the time of installation, a suitable delivery spout from the available set of different delivery spouts, said outlet union of the cock unit body comprising an internally threaded sleeve and, screwed into said sleeve, a threaded bushing having radial delivery bores, said inlet union of each spout comprising a cylindrical seat complementary to the external surface of said sleeve, and a sealing gasket that seals between said spout and said sleeve, and further comprising a threaded fastener member cooperable with said threaded bushing in releasably connecting a delivery spout of said set, having no flexible pipe, to said outlet union of the cock unit body, and at least one of the delivery spouts of said set having a fixed mouth, a flexible pipe and means for controllably deviating the flow either of said fixed mouth or to said flexible pipe, said means being operatively cooperable with said bushing of the outlet union of the cock unit body.

\* \* \* \* \*